United States Patent [19]

Farooq

[11] Patent Number: 4,568,097
[45] Date of Patent: Feb. 4, 1986

[54] TURBO AIR MOTOR FOR BICYCLES
[76] Inventor: Anwar M. Farooq, 936 Lake Ave., Metairie, La. 70005
[21] Appl. No.: 570,946
[22] Filed: Jan. 16, 1984
[51] Int. Cl.[4] .............................................. B62M 1/10
[52] U.S. Cl. .................................................... 280/216
[58] Field of Search ...................... 280/216, 215, 214; 180/7.4, 7.1

[56] References Cited

U.S. PATENT DOCUMENTS 735,628  8/1903  Waxel ................................... 280/216
3,941,075  3/1976  Rupenian ............................ 280/216

Primary Examiner—John A. Pekar
Attorney, Agent, or Firm—George A. Bode

[57] ABSTRACT

A bicycle drive means comprising a bicycle having a main frame and air passageway throughout a substantial portion of the main frame, an air intake means in fluid communication with the air passageway, an air compressor engaged with the front sprocket assembly of the bicycle and in fluid communication with the air passageway of the main frame for directing air flow into the main frame, a hollow rear frame member engaged with the main frame and the rear wheel of the bicycle for receiving the air flow from the main frame passageway and a turbine directly engaged with the rear axle of the bicycle and in fluid communication with the hollow rear frame member whereby driving forces imparted to the bicycle provide air flow from the air intake to the turbine.

4 Claims, 7 Drawing Figures

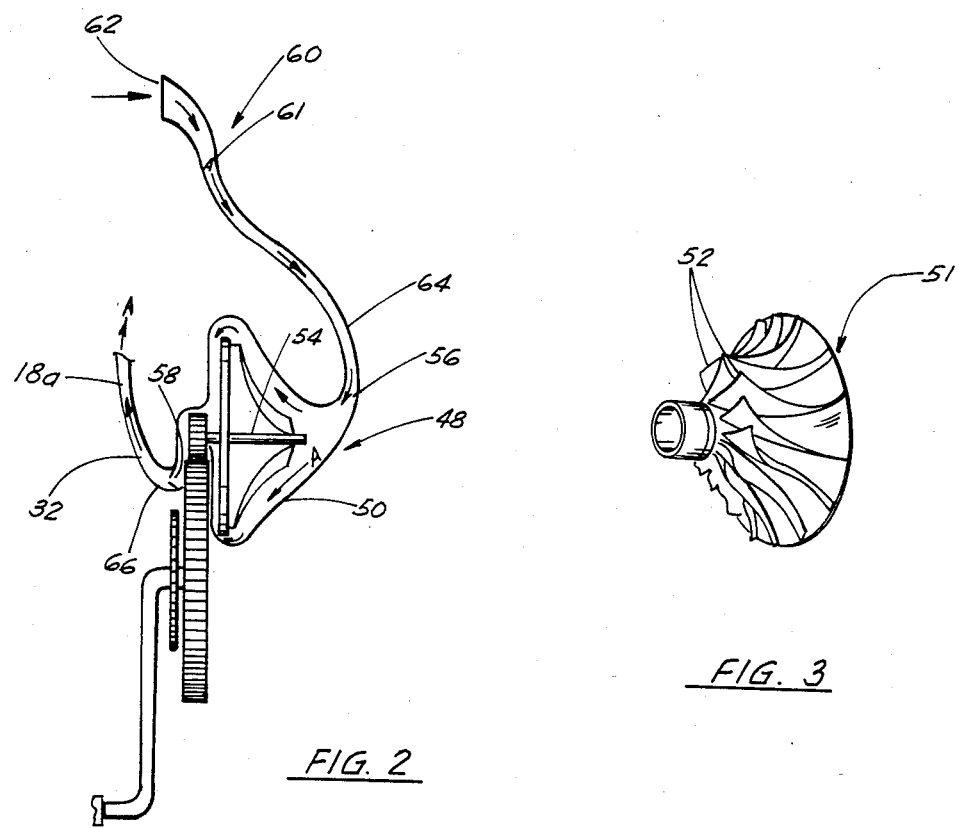
FIG. 2
FIG. 3
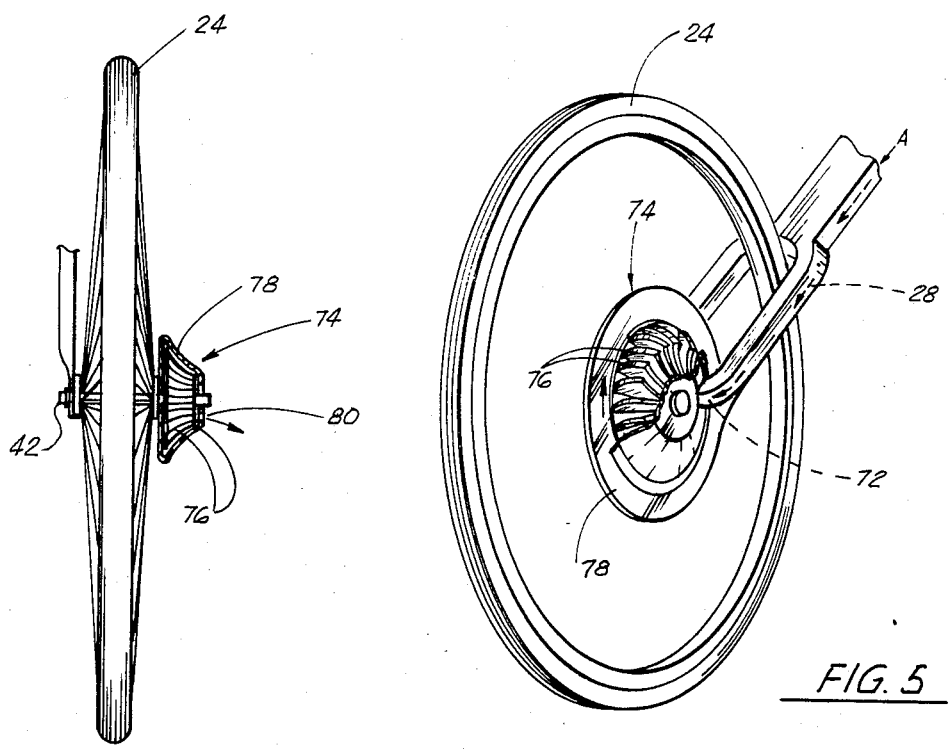
FIG. 4
FIG. 5

TURBO AIR MOTOR FOR BICYCLES

BACKGROUND OF THE INVENTION

1. Field of the Invention

The invention relates to the application to a conventional bicycle of the creation of air pressure while pedaling to provide assistance in the forward motion of the bicycle as well as providing forward motion to the bicycle without pedaling after air pressure as been stored within an air chamber.

2. General Background

In the area of providing air motor devices to assist in driving cycles, various apparatus have been used.

British Pat. No. 516,318, issued to P. C. Roberts, discloses a bicycle propelled by foot power which provides an air intake for providing air to a vaned rotor which transmits power developed by the air motor to the rear wheel of the cycle by means of a pulley and belt.

U.S. Pat. No. 1,650,450, issued to L. Jochum, discloses a bicycle having a compressed air receiver which receives air from a double air pump engaged with the rear wheel. The compressed air receiver provides compressed air to a turbine which is provided with a pulley and a belt engaged with the rear wheel to provide the power created from the compressed air through the turbine through the rear wheel.

U.S. Pat. No. 1,410,326, issued to J. Labak discloses a bicycle equipped with air pumps for providing compressed air to a storage tank which is connected by an inlet pipe to the air motor which drives the rear wheel of the bicycle through a system of sprockets and a chain.

U.S. Pat. No. 1,374,797, issued to D. Zaborsky, discloses a bicycle with a spring motor for storing and releasing energy for the purpose of aiding the rider when desired as in ascending grades.

U.S. Pat. No. 2,177,381, issued to C. Bichi, discloses a bicycle with a hydraulic drive means for storing and releasing energy to assist the rider in propulsion of the bicycle.

Swiss Pat. No. 7771, French Pat. No. 820,632, and German Pat. No. 850,405, teach manually propelled fluid pressure driven bicycles that allow a person to build up a reservoir of pressure to assist in cycling.

French Pat. No. 961,700 is representative of other patents found in the art.

GENERAL DISCUSSION OF THE INVENTION

The invention generally comprises a conventional bicycle which utilizes compressed air acting directly on the rear wheel to provide a driving force to the bicycle.

A front air intake is provided on the bicycle which is in communication with a centrifugal compression pump. The centrifugal compression pump is driven by a gear in engagement with the front sprocket of the bicycle and is driven when the bicycle is pedaled in the normal manner. The air is driven from the centrifugal pump into the main frame of the bicycle through a one-way valve. The air flows through the frame of the bicycle and into the normal rear supporting member of the bicycle through a one-way pressure valve and is then directed against a turbine directly connected to the rear axle of the bicycle. The air pressure against the turbine on the rear wheel of the bicycle provides a forward driving force to the bicycle.

As in the operation of a conventional bicycle, the person using the bicycle would start impart movement to the bicycle by pedaling. As the bicycle begins its forward movement, air is forced through the air intake and into the centrifugal pump where the air is then forced through the one-way valve into the main frame of the bicycle. Air pressure is built up in the main frame of the bicycle through the action of the centrifugal pump. When sufficient air pressure in the main frame is reached, the air is then forced through the one-way pressure valve at the rear of the bicycle and against the turbine. The air pressure acting against the turbine provides a force assisting in the forward driving motion of the bicycle and also provides forward motion to the bicycle without pedaling due to the stored up air pressure in the frame of the bicycle.

A safety release valve is provided near the rear of the bicycle so that excess pressure may be released automatically or by a control connected to the brake handle in the event that excess pressure should build up within the frame of the bicycle.

Therefore, it is an object of the present invention to provide an apparatus which aids the operator in providing driving force to the bicycle.

It is another object of the invention to provide an apparatus which provides driving force to the bicycle without pedaling being needed by the operator.

In accordance with the above objects, it is a feature of the invention to provide a centrifugal air pump for providing compressed air.

It is another feature of the invention to provide a chamber for the storage of compressed air.

It is another feature of the invention to provide a turbine to provide driving force to the bicycle when acted upon by the compressed air.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein:

FIG. 2 is a section taken along line 2—2 of FIG. 1.

FIG. 3 is a perspective view of the impeller of the centrifugal pump of the apparatus of the present invention.

FIG. 4 is a rear view of the rear wheel and turbine mounted thereto of the apparatus of the present invention.

FIG. 5 is a perspective view of the rear wheel and turbine mounted thereto of FIG. 4.

DETAILED DESCRIPTION OF THE PREFERRED EMBODIMENT

Figure 1:
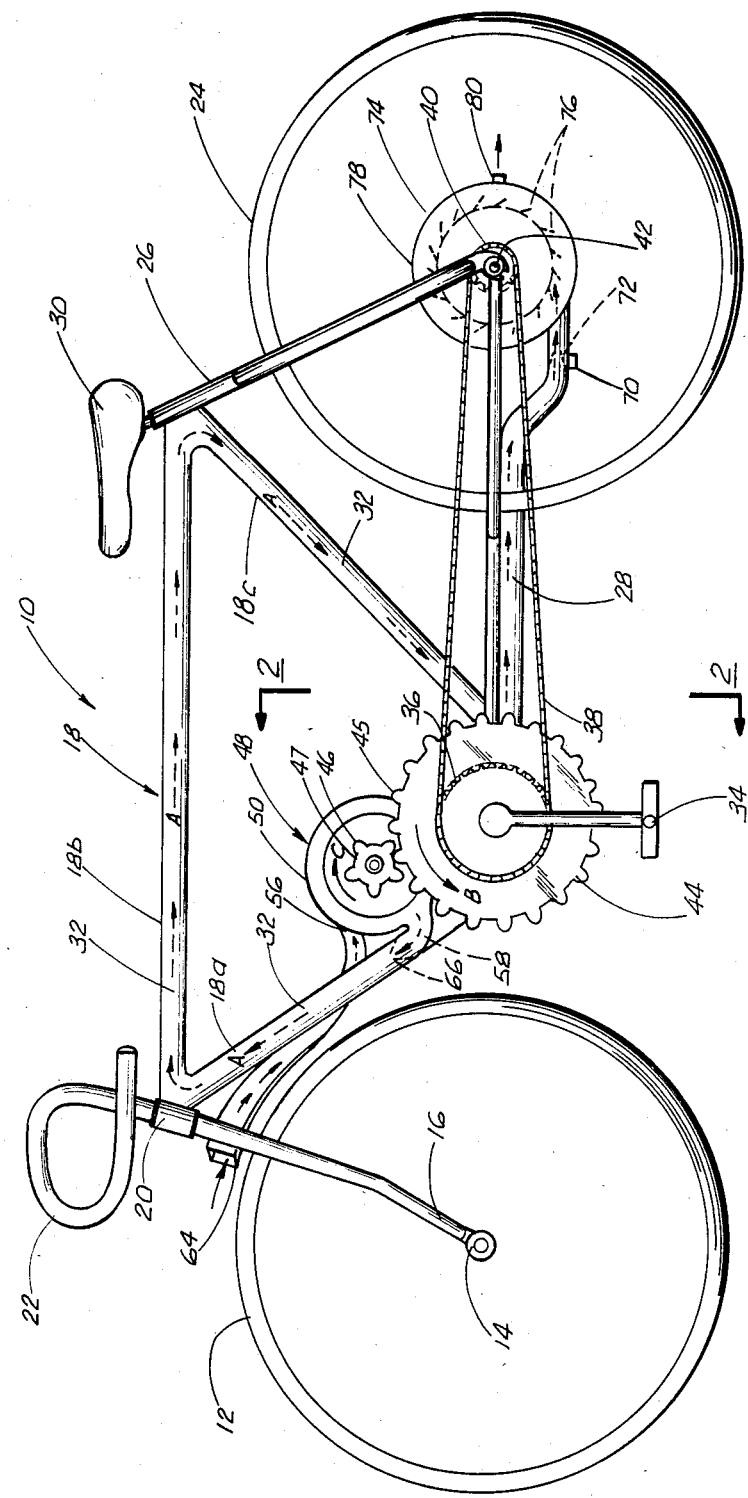
FIG. 1 is a side view of the preferred embodiment of the apparatus of the present invention.

It is seen from the drawing in FIG. 1 that the invention, generally referred to by the numeral 10, is constructed in the conventional configuration of a bicycle with the addition of means to aid the rider in the driving device 10.

As in a conventional bicycle, front wheel 12 is connected by front axle 14 to front fork 16. Fork 16 is connected to main tubular frame 18, comprised of tubes 18a, 18b, 18c, (to be further described in the specification) at journal 20 to privide for steering control through handle bars 22 which are connected to fork 16 through journal 20.

Main frame 18 is generally triangular in shape and connected to rear wheel 24 by a pair of rear supports 26 and a pair of horizontally disposed supports 28, with only one of each being illustrated in the drawing. Seat 30 is illustrated in FIG. 1 as being supported by rear supports 26 but may also be connected to main frame 18.

Main frame 18, for the purpose of this description, is comprised of three hollowed tubular sections 18a, 18b, and 18c which are intergrally connected to form triangular frame 18 and to provide a continuous air passageway 32 throughout frame 18 showing air flow in the direction of ARROWS A.

As in a conventional bicycle, pedals 34 and front sprocket 36 are provided at the lower part of frame 18. Chain 38 is threadably engaged around front sprocket 36 and rear sprocket 40 which is directly connected on one side of rear axle 42.

As best seen in FIGS. 1, 2 and 3, gear wheel 44 is intergrally connected to front sprocket 36 so that the speed in which gear wheel 44 turns is directly proportional to that of front sprocket 36. Gear teeth 45 of gear wheel 44 meshes with gear teeth 46 of centrifugal pump 48 so that pump wheel 47 is caused to rotate in a direction opposite that of gear wheel 44 (or in the direction of ARROW C) when bicycle 10 is pedaled forward or in the direction of ARROW B.

Centrifugal pump 48 is attached to frame portion 18a and is comprised of pump wheel 47 having gear teeth 46 thereon, housing 50, impellar 51, vanes 52, shaft 54, air inlet 56, and air outlet 58. Centrifugal pump 48 may be constructed of any suitable material such as aluminum or plastic.

Air scoop 60 is intergrally connected to centrifugal pump 48 at air inlet 56. Scoop 60 is mounted on frame member 18a for support and is angled upward and forward over front wheel 12 toward the front of bicycle 10. Scoop 60 is a hollow tubing 61 with an opening or air intake 62 at its forward end. As seen in FIGS. 1 and 2, scoop 60 tapers towards its rearward portion 64 so that it is of the same size as air inlet 56 on centrifugal pump 48. This tapering of scoop 60 causes the air that entered intake 62 as it reaches rearward portion 64 and thence enters centrifugal pump 48 through inlet 56 to have a greater velocity than it would have had if scoop 60 were of consistent dimensions throughout its length. Air intake 62 is provided with grill or screen 64 to prevent foreign matter from entering scoop 60.

As the operator of bicycle 10 pedals, air enters scoop 60 and then flows into centrifugal pump 48 where it is compressed and it is then forced through centrifugal pump 48 and out of air outlet 58 by the rotation of vanes 52 of impeller 51. Vanes 52 are shaped so as to most efficiently force air through centrifugal pump 48. As air exits outlet 58, it is forced through a first one-way valve 66 positioned in frame portion 18a adjacent to the point where outlet 58 is in communication with frame portion 18a. One-way valve 66 prevents any back pressure which may build up in air passage 32 from decreasing the effectiveness of vanes 52 in forcing air into frame 18.

From the ARROWS A in FIGS. 1 and 2, it is seen that the air is first forced from compressor 48 into frame 18a, and then into frame portion 18b, and then into frame portion 18c. Frame portion 18c is communicatively connected to a hollow horizontal rear support 28 so that the air in frame member 18c flows through support 28 in the direction of ARROWS A. The rear of support 28 is in fluid communication with turbine 74 so that air flow through support air passage 28 flows directly into turbine 74. Turbine 74 may be constructed of any suitable materials such as aluminum or plastic. Turbine vanes 76, which are curved for most efficient action by air flow against them, are connected to a shaft (not shown) in turbine 74 which is directly connected to rear axle 42. The turning of vanes 76 by the air pressure from passageway 28 aids in turning rear axle 42 and consequently imparting forward motion to bicycle 10. At the rear of turbine housing 78 is provided air exit port 80 to allow for the escape of air pressure which has been utilized in imparting motion to turbine vanes 76.

A second one-way valve 72, provided at the rear portion of support passageway 28, prevents any back pressure from occurring against the normal air flow through air passageway 28 and also provides an efficient means of delivering a high velocity air flow to turbine 74. Safety valve 70 is also provided in support passageway 28 in the event that excessive air pressure should build up in frame 18 or air passage 28. Safety valve 70 may be said to open automatically and release pressure at a pre-determined level and may also be connected to a brake lever (not shown) for automatic release of pressure when braking pressure is applied by the operator of bicycle 10.

In operation, the person using bicycle 10 would start movement of the bicycle by pedaling as with any conventional bicycle. As bicycle 10 begins its forward movement, air is forced through air scoop 60 and then into centrifugal pump 48 where it is compressed and then, forced by the rotation of vanes 52 of centrifugal pump 48, passed through one-way valve 66 into air passage 32 and then into the air passage in rear support 28. The rotation of vanes 52 also aids in introducing air into centrifugal pump 48 from scoop 60 since a partial vacuum is created by that rotation. When sufficient pressure is reached within air passages 32 and 28, air is forced past one-way pressure valve 72 and against curved turbine vanes 76 of turbine 74. Since turbine 74 is directly connected to rear axle 42, the motion imparted to turbine 74 by the air pressure aids in imparting forward motion to bicycle 10. The operator of bicycle 10 received two benefits from this action. Pedaling is made easier for a continued forward motion and the operator may also cease pedaling and obtain continued forward motion and retarded deceleration due to the air pressure which has been stored in air passages 32 and 28, and which has been acting upon turbine 74. When air pressure drops below a predetermined level, one-way pressure valve 72 closes and pedaling is again required until sufficient air pressure is again stored in air chambers 32 and 28. If a sudden stop should be necessary, a control may be provided on the handle bars 22 or integrated with a brake lever (not shown) to open safety valve 70 and release pressure in air passage 28 so that air does not flow past one-way pressure valve 72 and against turbine 74. This allows bicycle 10 to be slowed and stopped by the operator as safely and efficiently as a conventional bicycle. Safety valve 70 is also designed to open and release pressure automatically should excessive pressure build up in air passageway 28.

Figure 6:
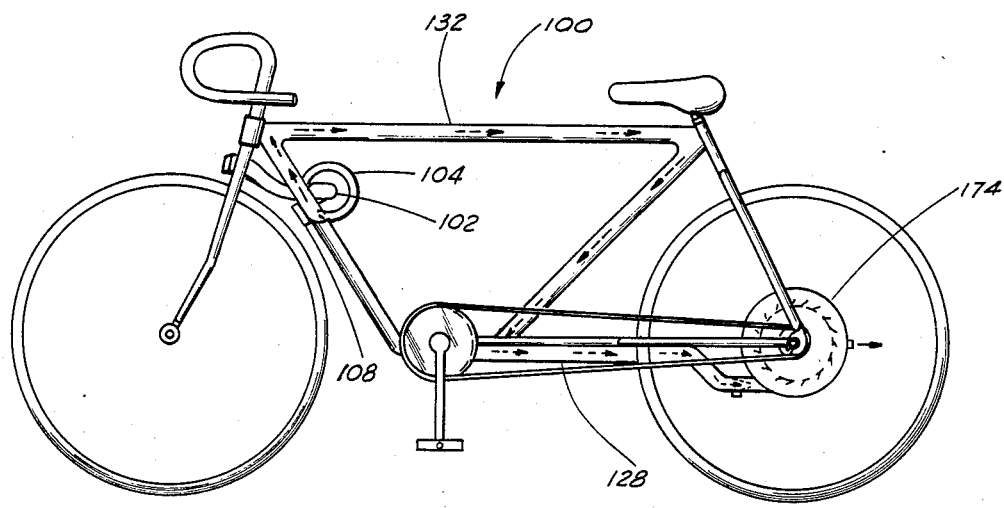
FIG. 6 is a side view of an alternate embodiment of the apparatus of the present invention.

In an alternate embodiment of the apparatus of the present invention illustrated in side view in FIG. 6 and designated generally by the numeral 100, a d.c. motor 102 is provided and powered by a battery 108 to drive a centrifugal pump 104 without being dependent upon pedaling. The load on the motor is constant regardless of the weight of the cyclist because the motor is only driving the centrigugal pump. In this way, compressed air can be provided to passageways 132 and 128 to be delivered to turbine 174 in much the same manner as the preferred embodiment. Thus in this alternate embodiment high revolutions per minute can be accomplished without the necessity of foot power.

Figure 7:
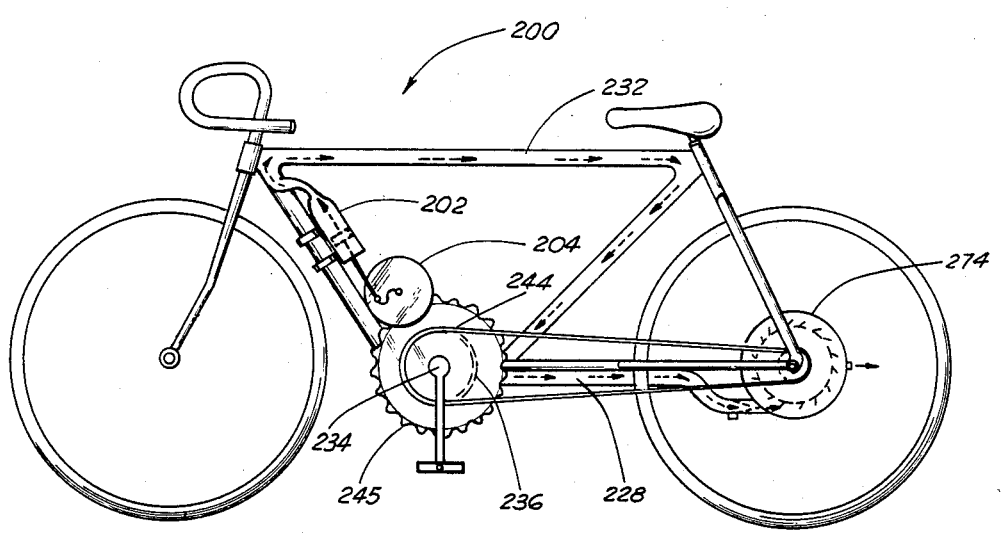
FIG. 7 is a side view of another alternate embodiment of the apparatus of the present invention.

A further alternate embodiment is illustrated in FIG. 7 and designated generally by the numeral 200 and substitutes for the compressor 48 of the preferred embodiment, a piston driven pump 202 which is in turn driven by gear 204 the teeth of which are not shown but in engagement with gear teeth 245 of gear wheel 244 driven by sprocket 236 of pedal mechanism 234. Thus in this embodiment, additional driving force is provided by compressed air provided to passageways 232 and 228 to be delivered to turbine 274 as the bike is pedaled.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A bicycle drive means, comprising:
   a. a bicycle having a main frame providing a fluid passageway therethrough;
   b. means operatively engaged with the front sprocket assembly of said bicycle and in fluid communication with said passageway of said main frame for directing fluid flow into said main frame passageway;
   c. a first one-way valve positioned in said fluid inlet whereby fluid flow is prevented from exiting said main frame;
   d. fluid inlet means in fluid communication with said means operatively engaged with said front sprocket assembly;
   e. a centrifugal air pump mounted on said main frame and operatively engaged with a front sprocket of said bicycle whereby said pump operates in conjunction with said front sprocket to direct fluid flow into said air passageway of said main frame;
   f. an air inlet on said pump;
   g. an air outlet on said pump in fluid communication with said air inlet in said main frame;
   h. a hollow rear frame member in fluid communication with said air passageway of said main frame and the rear wheel assembly of said bicycle for providing fluid flow from said main frame passageway to said rear wheel assembly;
   i. a turbine for imparting rotational movement to the rear wheel axle of said rear wheel assembly of said bicycle in fluid communication with said hollow rear frame member whereby driving forces provide air flow from said fluid intake into said turbine; and
   j. an air scoop mounted on the forward part of said main frame and in fluid communication with said air inlet of said centrifugal pump.

2. The apparatus of claim 1, wherein said air scoop tapers from a relatively wide diameter at its forward portion to a narrower diameter at its rear portion substantially equal to that of said air inlet on said centrifugal pump.

3. The apparatus of claim 1, wherein said centrifugal air pump further comprises:
   a. a housing;
   b. a shaft rotatably mounted within said housing and operatively engaged with a front sprocket on said bicycle; and
   c. a plurality of curved vanes mounted on said shaft for directing air flow through said centrifugal pump.

4. The apparatus of claim 1, further comprising:
   a second one-way valve in said hollow rear frame member substantially at the position where said rear frame member is in fluid communication with said turbine; and
   a third valve member mounted in said hollow rear frame member whereby excessive air pressure is automatically released, said third valve member being connected to a hand brake whereby said third valve member opens and releases pressure when said hand brake is applied.